July 20, 1948.  A. Y. DODGE  2,445,710
ADJUSTABLE CRANK
Filed Feb. 14, 1944  2 Sheets-Sheet 1
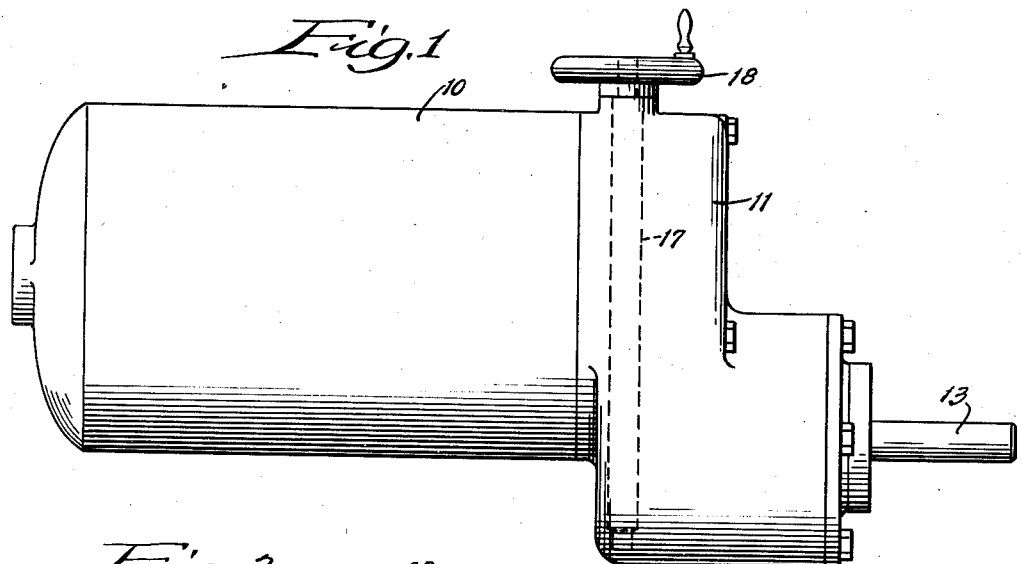
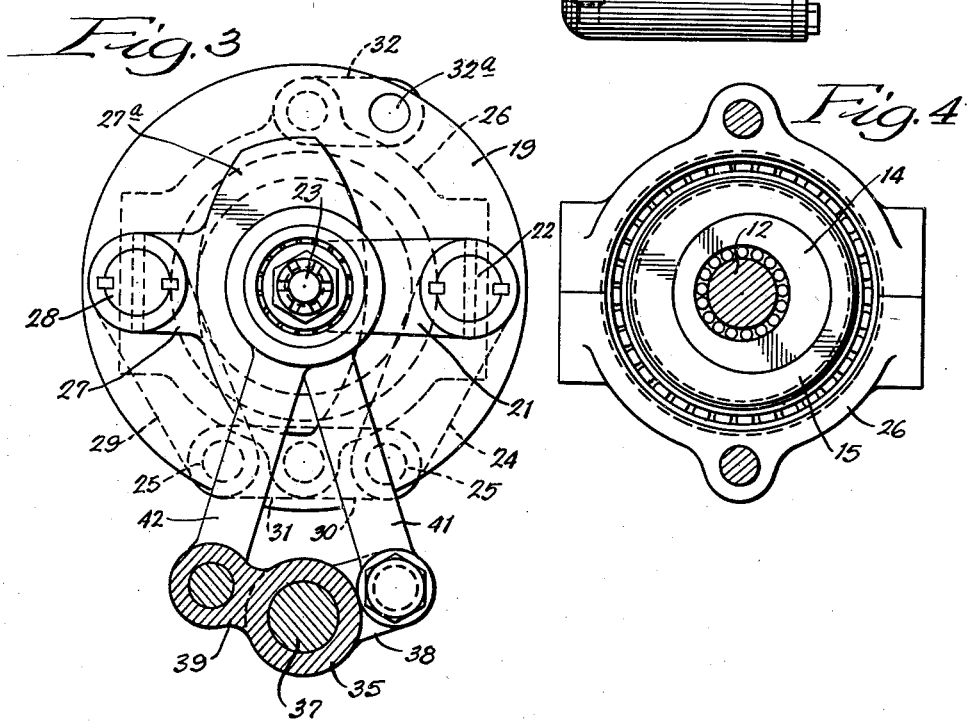
Inventor:
Adiel Y. Dodge,
By Dawson, Ooms & Booth
Attorneys.

July 20, 1948. A. Y. DODGE 2,445,710
ADJUSTABLE CRANK
Filed Feb. 14, 1944 2 Sheets-Sheet 2
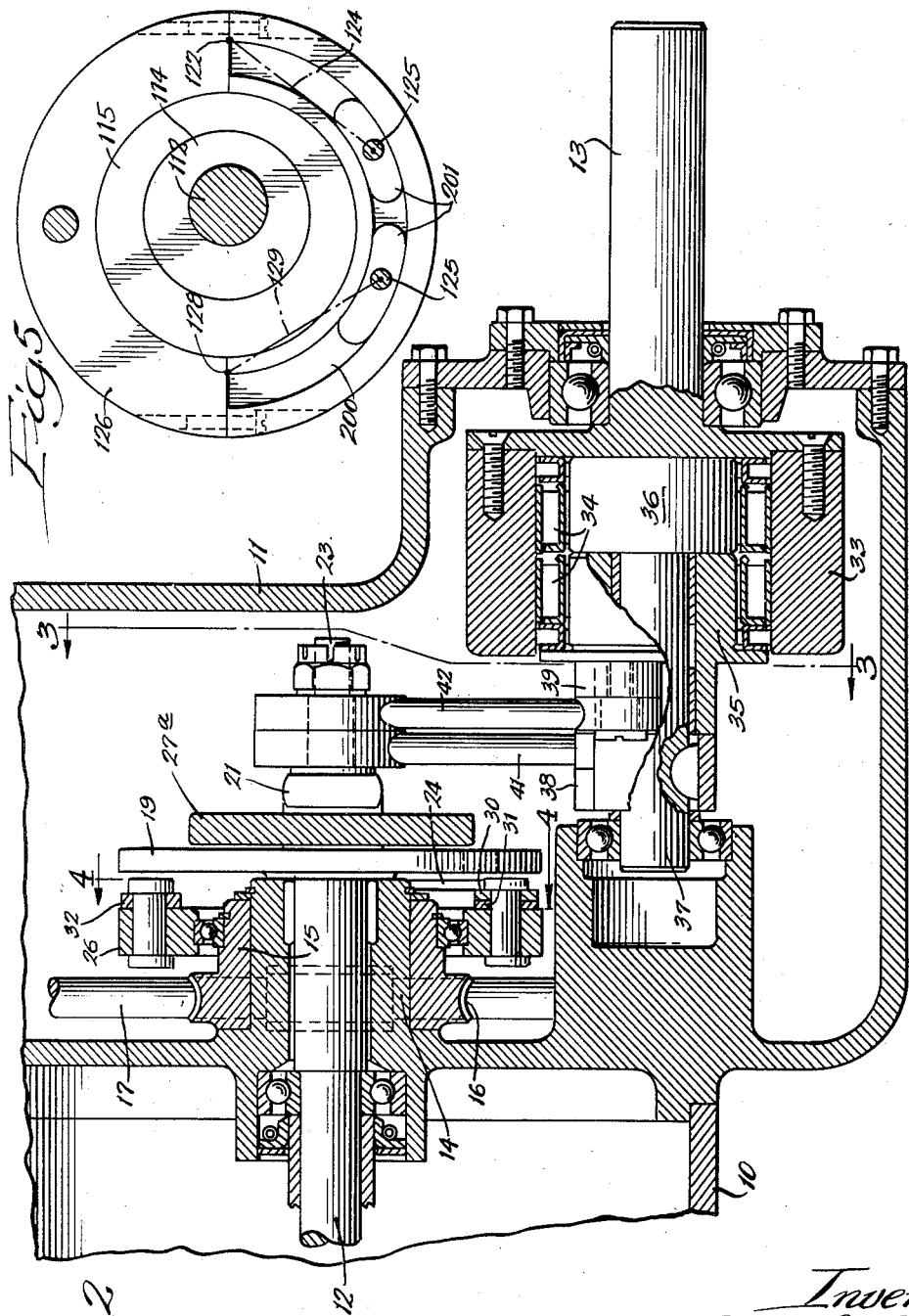

Patented July 20, 1948

2,445,710

UNITED STATES PATENT OFFICE 2,445,710

ADJUSTABLE CRANK

Adiel Y. Dodge, Rockford, Ill.

Application February 14, 1944, Serial No. 522,221

5 Claims. (Cl. 74—600)

This invention relates to mechanical torque transmission and more particularly to an impulse type transmission for driving a driven shaft through a series of torque impulses.

One of the objects of the invention is to provide a mechanical torque transmission which is adjustable to provide an infinite number of torque ratios.

Another object of the invention is to provide a mechanical torque transmission of the impulse type which is dynamically balanced.

Still another object of the invention is to provide a mechanical torque transmission in which the driven shaft receives a large number of torque impulses during each revolution.

A further object of the invention is to provide a mechanical torque transmission which is small, compact and easily controlled and which operates at high efficiency.

The above and other objects of the invention will be more readily apparent from the following description when read in connection with the accompanying drawing, in which—

Figure 1 is a plan view of a driving unit embodying the invention;

Figure 2 is an enlarged section of a part of the driving unit of Figure 1;

Figures 3 and 4 are partial sections on the line 3—3 and 4—4 respectively of Figure 2; and Figure 5 is a partial view similar to Figure 4 of an alternative construction.

The unit of Figure 1 is an integral motor unit including a motor 10 to one end of which a housing 11 is secured. The housing rotatably carries a driving shaft 12 which may be the motor armature shaft or an extension thereof and a driven shaft 13 which is parallel to but displaced from the driving shaft. The housing is formed around the driving shaft with a fixed eccentric 14 on which a second eccentric 15 is rotatably mounted. Preferably, the two eccentrics have the same degree of eccentricity so that they can be adjusted to a position as shown in Figure 4 in which the outer surface of the eccentric 15 is concentric with the axis of the driving shaft 12. By adjusting the eccentric 15 angularly about the eccentric 14 its degree of eccentricity can be varied to control the transmission as will be explained later. Preferably, the adjustment is effected by forming the eccentric 15 with a worm gear 16 meshing with a worm on a shaft 17 which projects through the housing and carries a hand wheel 18.

The driving shaft 12 carries within the housing a cross member or disc 19 which rotatably carries at one side of the shaft axis a driving crank 21. The crank is pivoted to the cross member at 22 and extends inwardly toward the axis of the driving shaft where it terminates in a crank pin 23. The crank 21 is preferably of such a length that the crank pin will be coaxial with the driving shaft in one position of the crank. The crank is also formed with an arm 24 rigid therewith and pivoted at 25 thru a link 30 to a ring 26 which is rotatable on the eccentric 15.

A second crank 27 is pivoted at 28 to the cross member at a point diametrically opposite to the axis 22 of the first crank. The crank 27 is formed with a counter-balance weight 27a extending toward the axis of the driving shaft and underlying the crank 21. An arm 29 rigid with the crank 27 is pivoted thru a link 31 to the ring 26, the links 30 and 31 being pivoted to the ring 26 on a common axis.

As the driving shaft rotates, the ring 26 will be turned with it by a link 32 which is connected to disc 19 at 32a and to the ring. This moves one of the arms out at the same time and the other arm moves in. Due to the manner of connection this will cause the counter weight and crank pin to move in opposite directions so that a satisfactory dynamic balance is obtained.

The driven shaft 13 terminates in the housing in a cup or sleeve member 33. The sleeve member 33 is connected through a pair of one way clutches 34 with driving members 35 and 36 which are coaxial with the driven shaft. The driving member 36 is formed with a shaft extension 37 on which the member 35 is rotatably mounted. The shaft 37 carries an arm 38 as shown in Figure 3 and the driving member 35 is formed with a similar arm 39 extending in the opposite direction from the arm 38. The arms 38 and 39 are connected to the crank pin 33 by connecting rods 41 and 42 respectively.

In operation with the eccentric 15 adjusted to be eccentric to the driving shaft, the crank pin will describe circles at a rate twice the rate of revolution of the driving shaft. This is due to the fact that the circle described by the crank pivot 22 crosses or parallels the eccentric circle at two diametrically opposite points so that the crank will cross the axis of the driving shaft twice during each revolution. Stated another way, the crank is caused to describe one circle due to revolution of the driving shaft and another circle due to the action of the eccentric thereon. As seen in Figure 3 when the crank pin moves up the arms 38 and 39 will be moved up to turn the driving member 35 clockwise and the driving member 36 counter-clockwise. If the driven shaft is to be driven clockwise the one way clutch 34 connected to the driving member 35 will engage and the driving member 35 will impart a torque impulse to the driven shaft. At this time the other one-way clutch overruns. Upon a reversal of movement with the crank pin moving downwardly, the driving member 36 will be turned clockwise and will drive the driven shaft through its one-way clutch 34. Thus for each revolution of the crank pin the driven shaft will receive two impulses and since the crank pin revolves at twice the speed of the driving shaft, the driven shaft will receive four impulses for each revolution of the driving shaft. By adjusting the eccentric 15 the amount of travel of the crank pin can be adjusted to vary the rate of revolution of the driven shaft through an infinite number of steps.

Figure 5 shows an alternative construction for connecting the cranks to the eccentric ring parts therein corresponding to like parts in Figures 1 to 4 being designated by the same reference numerals plus 100. In this construction, the eccentric ring 126 is in the form of a two-part ring, one part of which is provided with a circumferential groove 200. Blocks 201 are slidable in the groove and may be held in place by forming the groove and blocks with interfitting slots and projections. The blocks are pivoted at 125 to the crank arms indicated by the dotted lines 124 and 129 respectively whose pivot points to the fixed cross member on the driving shaft are indicated by 122 and 128.

In the operation of this construction the blocks 201 may slide in the slot 200 as the eccentric ring moves to swing the cranks oppositely. Aside from the difference in connection between the crank arms and eccentric ring this construction operates the same as that of Figures 1 to 4.

While two embodiments of the invention have been shown and described in detail herein, it will be understood that they are illustrative only and are not intended as a definition of the scope of the invention, reference being had for this purpose to the appended claims.

What is claimed is:

1. In a mechanical torque transmission for connecting a driving shaft to a driven shaft, a cross member adapted to be carried by the driving shaft, an eccentric adjacent the cross member, a bell crank pivoted in the cross member, means operatively connecting one end of the bell crank to the eccentric, a crank pin at the other end of the bell crank, a weight pivoted on the cross member, and means operatively connecting the weight to the eccentric to move the weight in a direction opposite to the direction of movement of the crank pin.

2. In a mechanical torque transmission for connecting a driving shaft to a driven shaft, a cross member adapted to be carried by the driving shaft, an eccentric adjacent the cross member, a bell crank pivoted in the cross member, means operatively connecting one end of the crank to the eccentric, a crank pin at the other end of the bell crank, a second bell crank pivoted in the cross member and operatively connected at one end to the eccentric, and a weight on the other end of the second bell crank to be moved by the eccentric in a direction opposite to the direction of movement of the crank pin.

3. In a mechanical torque transmission for connecting a driving shaft to a driven shaft, a cross member adapted to be carried by the driving shaft, an eccentric adjacent the cross member, a bell crank pivoted in the cross member, means including a link operatively connecting one end of the bell crank to the eccentric, a crank pin at the other end of the bell crank, a second bell crank pivoted in the cross member at a point diametrically opposite to the first bell crank, a link operatively connecting the second bell crank to the eccentric at the same point at which the first named link is connected to the eccentric, and a weight on the other end of the second bell crank extending toward the first bell crank so that the weight and crank pin will move in opposite directions as the driving shaft turns relative to the eccentric.

4. In a mechanical torque transmission for connecting a driving shaft to a driven shaft, a cross member on the driving shaft, an eccentric adjacent the cross member, a ring rotatable on the eccentric having a circumferential groove therein, a block slidable in the groove, a bell crank pivoted in the cross member having a crank pin lying adjacent the driving shaft axis in one position of the crank, an arm on the bell crank pivoted to the block, and means connecting the ring to the driving shaft to turn the ring on the eccentric.

5. In a mechanical torque transmission for connecting a driving shaft to a driven shaft, a cross member on the driving shaft, an eccentric adjacent the cross member, a ring rotatable on the eccentric having a circumferential groove therein, a block slidable in the groove, a bell crank pivoted in the cross member having a crank pin lying adjacent the driving shaft axis in one position of the crank, an arm on the bell crank pivoted to the block, means connecting the ring to the driving shaft to turn the ring on the eccentric, a second bell crank pivoted in the cross member diametrically opposite to the first bell crank having a weight lying adjacent the driving shaft axis in one bell crank position, an arm on the second crank, and a second block slidable in the groove pivoted to the last named arm.

ADIEL Y. DODGE.

REFERENCES CITED

The following references are of record in the file of this patent:

UNITED STATES PATENTS

| Number | Name | Date |
|---|---|---|
| 27,057 | Lazelle | Feb. 7, 1860 |
| 291,645 | Thurston | Jan. 8, 1884 |
| 462,299 | Bullock | Nov. 3, 1891 |
| 2,036,624 | Garratt | Apr. 7, 1936 |
| 2,036,625 | Garratt | Apr. 7, 1936 |
| 2,209,417 | Obermoser | July 30, 1940 |

FOREIGN PATENTS

| Number | Country | Date |
|---|---|---|
| 210,961 | Great Britain | Feb. 14, 1924 |
| 493 | Australia | Feb. 2, 1931 |